US006868477B2

(12) United States Patent
Hoskins et al.

(10) Patent No.: US 6,868,477 B2
(45) Date of Patent: Mar. 15, 2005

(54) METHOD AND APPARATUS FOR OPTIMIZING SKIP MASK OPERATIONS IN A DISC DRIVE

(75) Inventors: Edward Sean Hoskins, Longmont, CO (US); Francis T. Seuberling, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 416 days.

(21) Appl. No.: 09/726,369

(22) Filed: Nov. 29, 2000

(65) Prior Publication Data

US 2001/0032292 A1 Oct. 18, 2001

Related U.S. Application Data

(60) Provisional application No. 60/169,021, filed on Dec. 3, 1999.

(51) Int. Cl.[7] .............................................. G06F 13/14
(52) U.S. Cl. .................................. 711/112; 360/77.02
(58) Field of Search ....................... 360/77.02; 711/112

(56) References Cited

U.S. PATENT DOCUMENTS

| 5,276,662 A | 1/1994 | Shaver, Jr. et al. ............. 711/4 |
| 5,835,930 A | 11/1998 | Dobbek ......................... 711/4 |
| 5,983,309 A | 11/1999 | Atsatt et al. ................... 711/4 |

OTHER PUBLICATIONS

Method, System and Interface for Mapping Tracks in No–ID Disk Drives, IBM TDB vol. 38, No. 12, Dec. 1995, pp. 275–277.*
Automated Hardware Processing of Direct Access Storage Device Skip Masks, IBM TDB vol. 39, No. 05, May 1996, pp. 121–122.*
Skip Mask Operation in a No–ID Disk Drive, IBM TDB vol. 39, No. 06, Jun. 1996, pp. 47–50.*

* cited by examiner

*Primary Examiner*—David L. Robertson
(74) *Attorney, Agent, or Firm*—David K. Lucente; Derek J. Berger (57) ABSTRACT

A skip mask mechanism is implemented in a disc drive in order to increase performance by minimizing the number of necessary disc rotations required while executing a set of pseudo-sequential commands. The drive includes an interface between the host computer and the drive, a read/write channel between the interface and the transducer/head, a formatter between the interface and the read/write channel for timing when data is transferred between the interface and the read/write channel, and a skip mask mechanism interposed between a target calculator and the formatter that provides a masked input to the formatter for controlling passage of data between the interface and the read/write channel.

8 Claims, 10 Drawing Sheets

READY QUEUE MANAGEMENT FLOWCHART
(BOTH EXIT AND ENTRY SKIP MASK ALGORITHM)

FIG.8

| HEAD | | | | CYLINDER 0 | | | | | |
|---|---|---|---|---|---|---|---|---|---|
| 0 | CylPBA | 0 | 1 | 2 | 3 | 4 | 5 | 6 | 7(s) |
|   | CylLBA | 0 | SLIP | 1 | 2 | 3 | 4 | SLIP | 5 |
|   | PHYSCTR | 0 | 1 | 2 | 3 | 4 | 5 | 6 | 7 |
|   | LSN | 0 | NVS | 1 | 2 | 3 | 4 | NVS | 5 |
| 1 | CylPBA | 8 | 9 | 10 | 11 | 12 | 13 | 14 | 15(s) |
|   | CylLBA | 6 | 7 | SLIP | 8 | 9 | 10 | 11 | 12 |
|   | PHYSCTR | 0 | 1 | 2 | 3 | 4 | 5 | 6 | 7 |
|   | LSN | 0 | 1 | NVS | 2 | 3 | 4 | 5 | 6 |
| 2 | CylPBA | 16 | 17 | 18 | 19 | 20 | 21 | 22 | 23(s) |
|   | CylLBA | 13 | SLIP | 14 | 15(a) | 16 | 17(a) | 18(a) | 19 |
|   | PHYSCTR | 0 | 1 | 2 | 3 | 4 | 5 | 6 | 7 |
|   | LSN | 0 | NVS | 1 | 2(a) | 3 | 4(a) | 5(a) | 6 |
| 3 | CylPBA | 24 | 25 | 26 | 27 | 28 | 29 | 30 | 31(s) |
|   | CylLBA | 20 | 21 | 22 | 23 | 24 | 25 | 26 | 27 |
|   | PHYSCTR | 0 | 1 | 2 | 3 | 4 | 5 | 6 | 7 |
|   | LSN | 0 | 1 | 2 | 3 | 4 | 5 | 6 | 7 |

KEY:
(s)=SPARE
(a)=ALTERNATED
NVS=NOT A VALID SECTOR NUMBER

| CYLINDER | HEAD | LSN | | CYLINDER | HEAD | PHYSCTR |
|---|---|---|---|---|---|---|
| 0 | 0 | 1 | ⟹ | 0 | 0 | 2 |
| 0 | 0 | 3 | | 0 | 0 | 4 |
| 0 | 0 | 5 | | 0 | 0 | 7 |
| 0 | 1 | 0 | | 0 | 1 | 1 |
| 0 | 1 | 2 | ⟹ | 0 | 1 | 4 |
| 0 | 1 | 4 | | 0 | 1 | 6 |
| 0 | 1 | 6 | | 0 | 2 | 0 |
| 0 | 2 | 0 | | 0 | 2 | 2 |
| 0 | 2 | 2 | ⟹ | 0 | 2 | 4 |
| 0 | 2 | 3 | | 0 | 2 | 5 |
| 0 | 2 | 4 | | 0 | 2 | 6 |

FIG.11

METHOD AND APPARATUS FOR OPTIMIZING SKIP MASK OPERATIONS IN A DISC DRIVE

RELATED APPLICATIONS

This application claims priority of U.S. provisional application Ser. No. 60/169,021, filed Dec. 3, 1999.

FIELD OF THE INVENTION

This application relates generally to data storage management in a disc drive having logically non-consecutive sectors, and more particularly to an implementation of skip mask hardware to assist in minimizing the number of necessary disc rotations in accessing a set of logically non-consecutive sectors.

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into sectors. A sector is normally the smallest individually addressable unit of information stored in a disc drive and typically holds 512 bytes of information plus a few additional bytes for internal drive control and error detection and correction. This organization of data allows for easy access to any part of the discs.

Generally, each of the multiple discs in a disc drive has associated with it two heads (one adjacent the top surface of the disc, and another adjacent the bottom) for reading and writing data to a sector. A typical disc drive has two or three discs. This usually means there are four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that these tracks form a cylinder since they are equal-sized circles stacked one on top of the other in space. So, for example, if a disc drive has four discs, it would normally have eight heads, and a cylinder number 680 would be made up of a set of eight tracks, one per disc surface, at track number 680. Thus, for most purposes, there is not much difference between tracks and cylinders since a cylinder is basically a set of all tracks whereat all the heads are currently located.

One of the heads must first be positioned over the correct location of a sector on the disc in order to access (i.e., read or write) the sector. This requires the heads to move to the correct track and then wait for the correct sector to pass under the appropriate head. Moving the heads to the correct track is measured by seek time. Waiting for a correct sector to pass under the appropriate head is measured by latency. Seek time and latency are two very important disc drive performance measurements. Seek time measures the amount of time required for the heads to move between tracks. Generally, the amount of time to switch between two tracks depends on the distance between the tracks; however, the relationship is not linear due to a certain amount of overhead involved in track switching. Latency, on the other hand, measures the time that the disc drive must wait for the correct sector to come around to where one of the heads is waiting for it. At the time the appropriate head arrives at and begins to follow the correct track, the actual sector for read or write may be located elsewhere on the disc spinning around at high speed. This causes a latency delay since the servo system must wait for the correct sector to arrive under the head.

A seek time delay and a latency delay are normally expressed in milliseconds. In a computing system, a millisecond is an enormous amount of time when the system memory speed is measured in nanoseconds. For example, a 200 MHz processor can theoretically execute 200,000 instructions in a millisecond. Thus, cutting the seek time and/or latency delays result in significant performance improvement in a computing system, because the computing system can execute a significant number of instructions instead of waiting for movement of the heads to a track or waiting for a correct sector to pass under one of the heads.

Particularly, storing data in a contiguous block of sectors on a track in a disc drive reduces latency. For example, latency is relatively a minor factor for reading or writing a large contiguous block of data on a track since the latency will only occur once while waiting to access the first sector of data. On the other hand, latency is an important performance-limiting factor for reading or writing noncontiguous multiple data blocks on a track.

Every sector in a disc drive is a good sector in an ideal world; however, typical disc drives contain unusable sectors when they are manufactured, because it is virtually impossible to create a disc drive with several million sectors and not have some errors. Imperfections in the media coating on the disc or other problems, for example, may make a sector inoperable. This usually shows up as an error when attempting to read the sector. Modern disc drives use an error correction code to help identify when errors occur and in some cases to correct them; however, there will still be physical flaws that prevent parts of a disc from being used. These unusable sectors, due to such physical flaws, are called defective sectors.

When defective sectors are discovered in the data storage area of a disc drive, each of the memory locations corresponding to the defective sectors are mapped to a good sector in another part of the data storage area. For this mapping purpose, spare sectors are reserved in a disc drive as substitutes for those defective sectors. Typically, each track has one spare sector at the end of the track. A disc drive controller keeps track of all defective sectors in the disc drive and automatically substitutes each of the defective sectors with a spare sector. When a host controller sends a command to read data from or write data to a defective sector, the disc drive controller seeks to the designated substitute sector taken from the pool of spare sectors rather than seeking to the defective sector. This technique is known as spare sectoring (or defect mapping) and causes defective sectors to be transparent to a user. In selecting a spare sector as a substitute, the disc drive controller always tries to use the spare sector on the same track to avoid a seek time delay associated with track switching. Nevertheless, a seek time delay cannot be avoided if more defective sectors are present on the track than available spare sectors on that track.

Moreover, in most cases, mapping a defective sector to a spare sector causes fragmentation of data. Once data is fragmented, each fragment of data introduces a latency delay to locate the beginning sector of each fragment and, if the next fragment starts on a different track, an additional seek time delay is introduced. Thus, there is a big performance difference between accessing data that is laid out contiguously on a disc and accessing data that is fragmented into a dozen pieces. In any case, greater seek time and/or latency causes slower access to data stored in a disc drive.

Typically in a disc drive, as data to be written or read to or from the drive is transferred from a host computer to or from the drive, the data is stored into a temporary buffer located on the drive. The data is more importantly stored in the buffer in the order in which it was received from either the host computer or the drive media itself. The data is also then transferred from the buffer to the disc or host computer in the same order.

Also, as mentioned above, each track in a disc drive is further partitioned into sectors that are typically arranged sequentially. That is, each sector on a track is adjacent to the previous and next sector. For example, sector 13 would be positioned between sector 12 and 14. This configuration is optimal for many reasons, one such reason being to maintain efficiency during an access of a large block of contiguous data. In such a case, since the sectors are positioned sequentially on a track, and since the data in the buffer is sequential and contiguous, performance is optimal. This is because once the head has seeked to the starting sector for transfer, the data in the buffer can simply be transferred directly to or from the disc, sector by sector. However, during typical operation, commands are rarely sent which access data in large sequential, contiguous blocks. For example, a host may send data for sectors 10 through 15 in the order of: 13-15-12-10-11-14, one sector at a time. Moreover, due to setup time of the disc drive firmware to process and handle incoming commands, the disc may rotate beyond a sector which is to be accessed according to the incoming commands. In this case, latency becomes a significant performance-reducing factor because even though all sectors may be located on the same track (thus seek time not being a performance issue), they are not in order, or may have rotated beyond head during the current disc rotation. Consequently, the disc must rotate several times to access the data as it transfers a sector at a time from the buffer to the disc.

In a disc drive, errors are sometimes encountered during the transfer of data. Any error detection mechanism known in the art may be employed to detect an error. Recovery from an error is relatively straightforward. There are essentially two pointers into the buffer; one pointer specifies where the host may next access buffer data, and the other pointer specifies where the disc may next access buffer data. Since the data in the buffer is continuous and sequential, the firmware can simply calculate based on the pointer locations and amount of data transferred, what to reset the pointers to, to repeat a transfer.

Accordingly there is a need for a mechanism which reduces the number of disc rotations needed on a transfer of non-sequential, and/or non-contiguous data from between a host computer and a disc drive. This mechanism will complicate the error recovery scheme, and will necessitate an enhanced buffer management technique to compensate.

SUMMARY OF THE INVENTION

Against this backdrop the present invention has been developed. The present invention is essentially an implementation of a skip mask scheme which reduces the number of necessary disc rotations of a disc during pseudo-sequential accesses. That is, it increases the performance of a disc drive during accesses of read and write commands that land on the same track but are not sequential and/or contiguous by minimizing the number of necessary disc rotations.

There is one preferred embodiment by which this can be achieved in a disc drive that is presently envisioned. However, other means will also become apparent to those skilled in the art upon reading the following description. This embodiment basically involves the disc drive constructing a transfer/no-transfer skip mask while processing commands as they are received, and then subsequently transferring as many sectors of data on a single track as possible while the disc passes under the head.

These and various other features as well as advantages that characterize the present invention will be apparent from a reading of the following detailed description and a review of the associated drawings.

DETAILED DESCRIPTION

Figure 1:
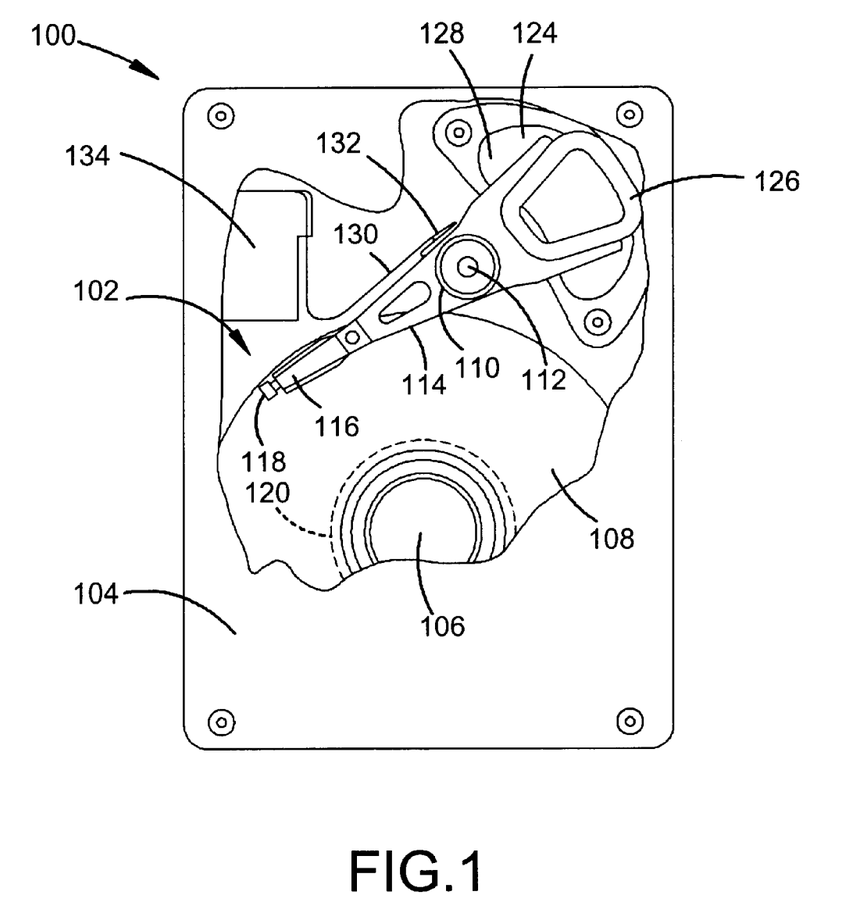
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are typically moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a preamplifier 132 to which head wires (not shown) are connected; the head wires being routed along the actuator arms 114 and the flexures 116 to the heads 118. The preamplifier 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
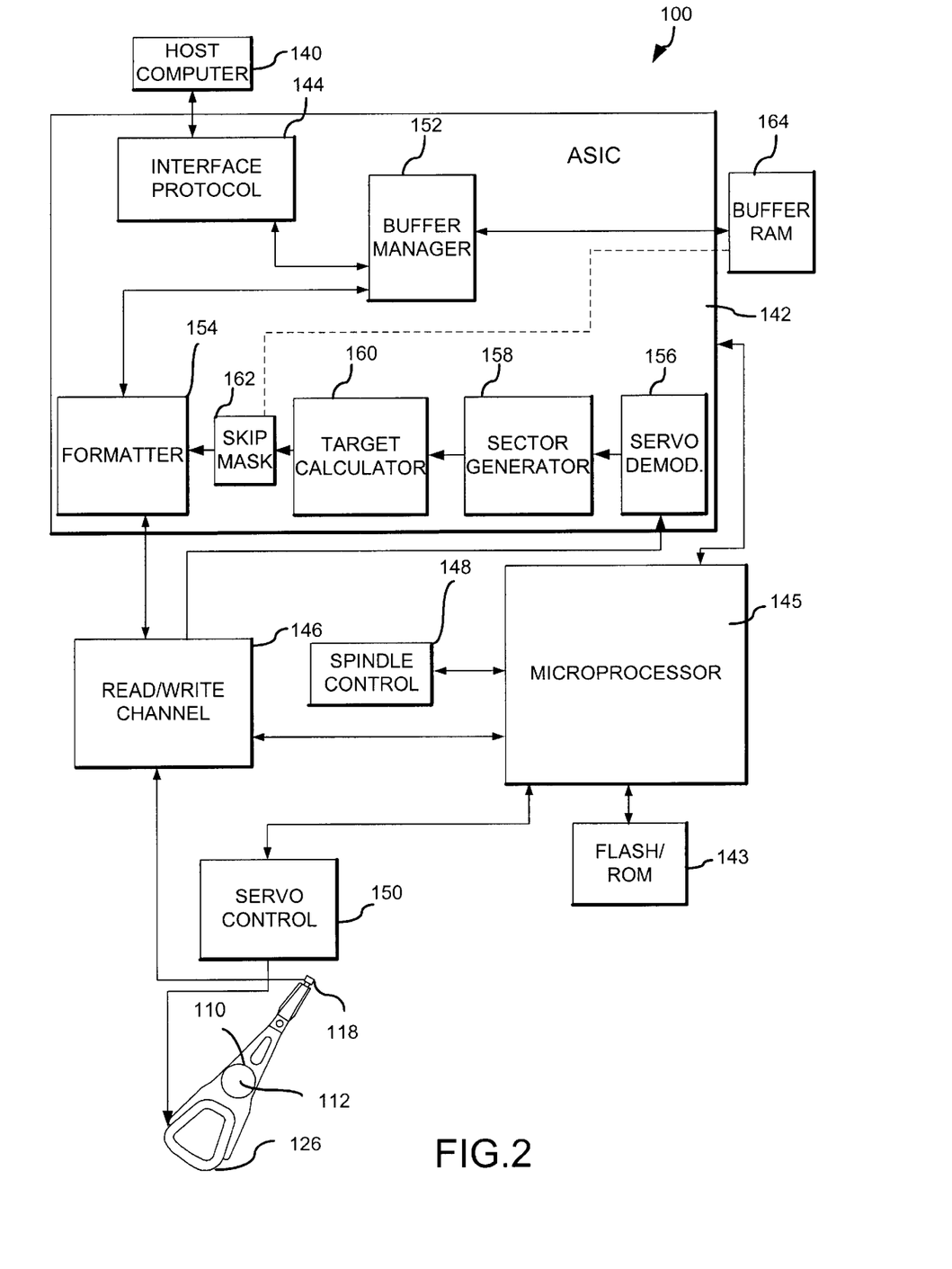
FIG. 2 is a simplified block diagram of a disc drive and its connection to the host computer system including a controller containing the present invention and servo system with which the present invention is particularly useful.

Referring now to FIG. 2, shown therein is a functional block diagram of the disc drive 100 of FIG. 1, generally showing the main functional circuits, which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive controller ASIC 142, the controller ASIC 142 generally providing top level communication and control for the disc drive 100 in conjunction with programming for the controller ASIC 142 stored in controller memory (MEM) 143. The MEM 143 can include random access memory (RAM), read only memory (ROM), and other sources of resident memory for the controller ASIC 142. The controller ASIC 142 encompasses a disc interface 144, a buffer manager 152, a formatter 154, a servo demodulator 156, a sector generator 158, a target calculator 160, and in the case of the present invention, skip mask hardware 162. The servo demodulator 156 is operably connected to a read/write channel 146. It interprets signals from the read/write channel 146 and sends a modified signal to the sector generator 158. The sector generator 158 calculates which sector the head 118 is accessing. This information is transferred to the target calculator 160. The target calculator 160 generates a pulse that informs the formatter 154 when the head 118 is over the desired sector for access. The formatter 154 uses this pulse to access the disc 108 through the read/write channel 146. Novel in the case of the present invention, the skip mask hardware 162 is positioned between the target calculator 160 and the formatter 154. The skip mask hardware 162 essentially "masks" the pulse generated by the target calculator 160 effectively informing the formatter 154 whether or not to perform a transfer.

The discs 108 are rotated at a constant high speed by a spindle control circuit 148, which typically electrically commutates the spindle motor 106 through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 145 receives information regarding the velocity and acceleration of the head 118, and uses that information in conjunction with a model, stored in memory 143, to communicate with the servo control circuit 150, which will apply a controlled amount of current to the voice coil motor coil 126, thereby causing the actuator assembly 110 to be pivoted.

Data is transferred between the host computer 140 and the disc drive 100 by way of a disc drive interface 144, a buffer manager 152, and a formatter 154, typically all included an a controller ASIC 142, and the buffer 164 itself. The buffer 164 is used to facilitate high speed data transfer between the host computer 140 and the disc drive 100. Data to be written to the disc drive 100 are thus passed from the host computer 140 to the interface 144, through the buffer 164, then further through the formatter 154 and then to the read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and outputs the retrieved data through the formatter 154 and buffer 164, to the interface 144 for subsequent transfer to the host computer 140.

Figure 3:
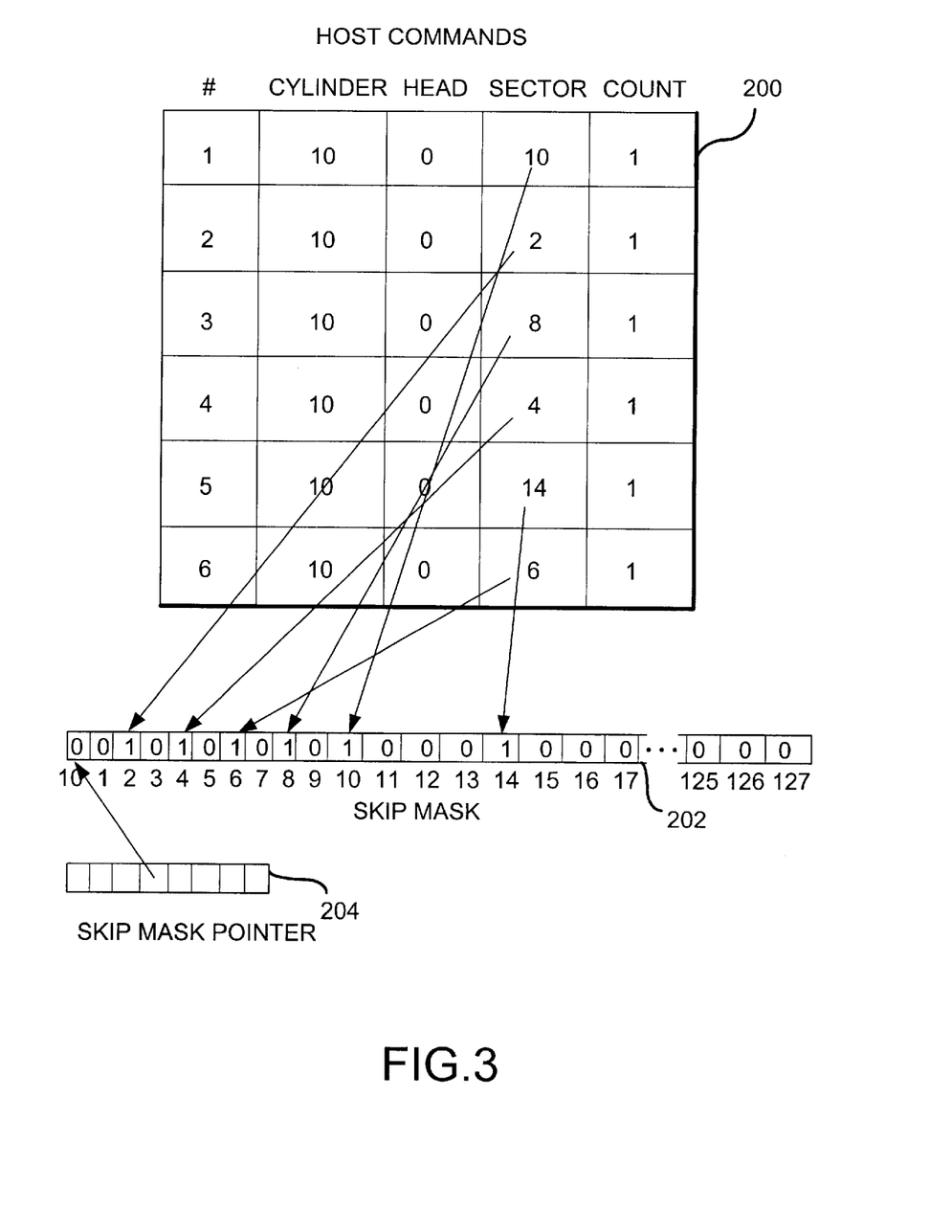
FIG. 3 is a diagram representing a set of host commands and how they map into skip mask hardware in accordance with a preferred embodiment of the present invention.

FIG. 3 illustrates how an incoming set of host commands corresponds to and is used by the disc drive firmware to build a transfer/no-transfer list in the skip mask hardware. The exemplary host commands table 200 illustrates 6 commands sent to the disc drive 100 from the host computer 140 in the order of the command number (#). Each command in this example specifies accessing disc data on the same track (Cylinder 10, Head 0). The commands also specify accessing data sectors in the order 10-2-8-4-14-6. Each command is either requesting or sending a count of 1, or in other words, 1 sector of data. The skip mask table 202 is a representation of the skip mask hardware. The skip mask 202 may be any type of holding hardware which permits loading and bit-wise reading. In a preferred embodiment as illustrated in FIG. 2, the skip mask hardware 202 is 128 bits. Preferably, the skip mask hardware 202 is a register consisting of a bank of eight 16-bit registers that are linked to form one large 128-bit register. A skip mask pointer register 204 is used to point to the first bit in the skip mask register 202 to be used during the next sector transfer operation.

Figure 4:
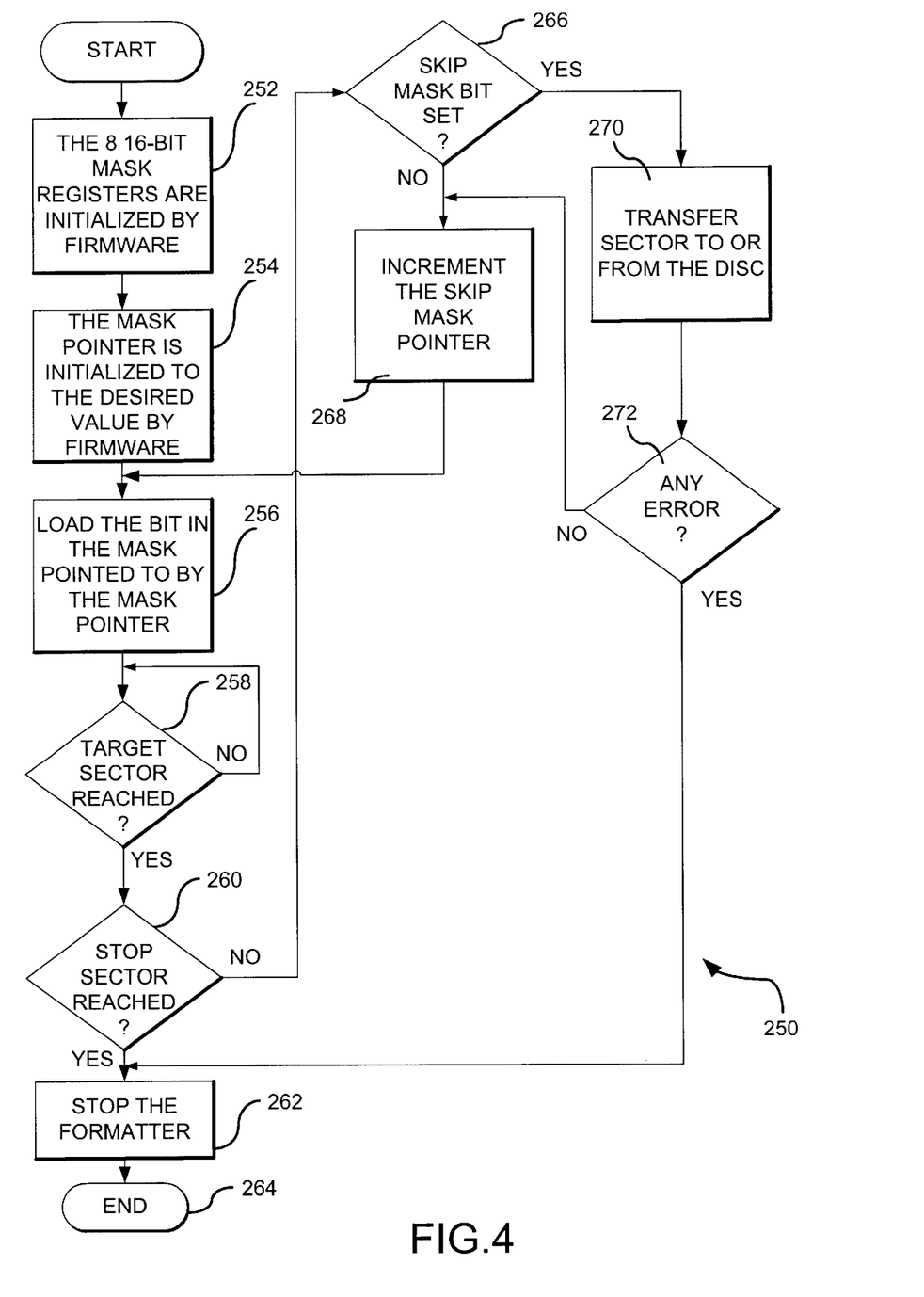
FIG. 4 is a skip mask hardware flowchart illustrating the skip mask mechanism process in accordance with a preferred embodiment of the present invention.

FIG. 4 is a flow diagram of a preferred embodiment 250 of the skip mask hardware operation in accordance with the present invention. The process beings in load operation 252. As depicted in the diagram, as commands are received by the disc drive 100, the firmware initializes the 128-bit skip mask register. Control then transfers to operation 254. Here, the skip mask pointer register 204 is initialized to point to the next transfer/no-transfer bit for the next sector. Control then transfers to operation 256 where the firmware loads the bit pointed to in the skip mask register 202. Control then transfers to query operation 258. Query operation 258 determines from the formatter 154, the servo generator 156, and the sector generator 158, whether the target sector for transfer has been reached; that is, whether the exact media location is oriented under the exact head for transfer. If the target sector has not yet been reached the hardware continues to wait. If the target sector has been reached, control transfers to query operation 260. Query operation 260 checks to see if the stop sector has been reached. The stop sector indicates an end of transfer. If the stop sector has been reached, control transfers to operation 262, which halts the formatter 154. Control then transfers to operation 264, and the sequence terminates. If query operation 260 determines that the stop sector has not been reached, control transfers to query operation 266. Query operation 266 interprets the skip mask bit previously loaded from the location pointed to by the skip mask pointer register 204. If the bit is not set, control transfers to operation 268. Operation 268 increments the skip mask pointer register 204 and control returns to operation 256. If query operation 266 determines that the skip mask bit is set, control transfers to operation 270. During operation 270, the media is accessed and the sector is transferred either to or from the disc 108. Control then transfers to query operation 272, where the transfer is checked for errors. If no errors occurred during the transfer, control returns to operation 268. If errors did occur during the transfer, control transfers to operation 262.

Figure 5:
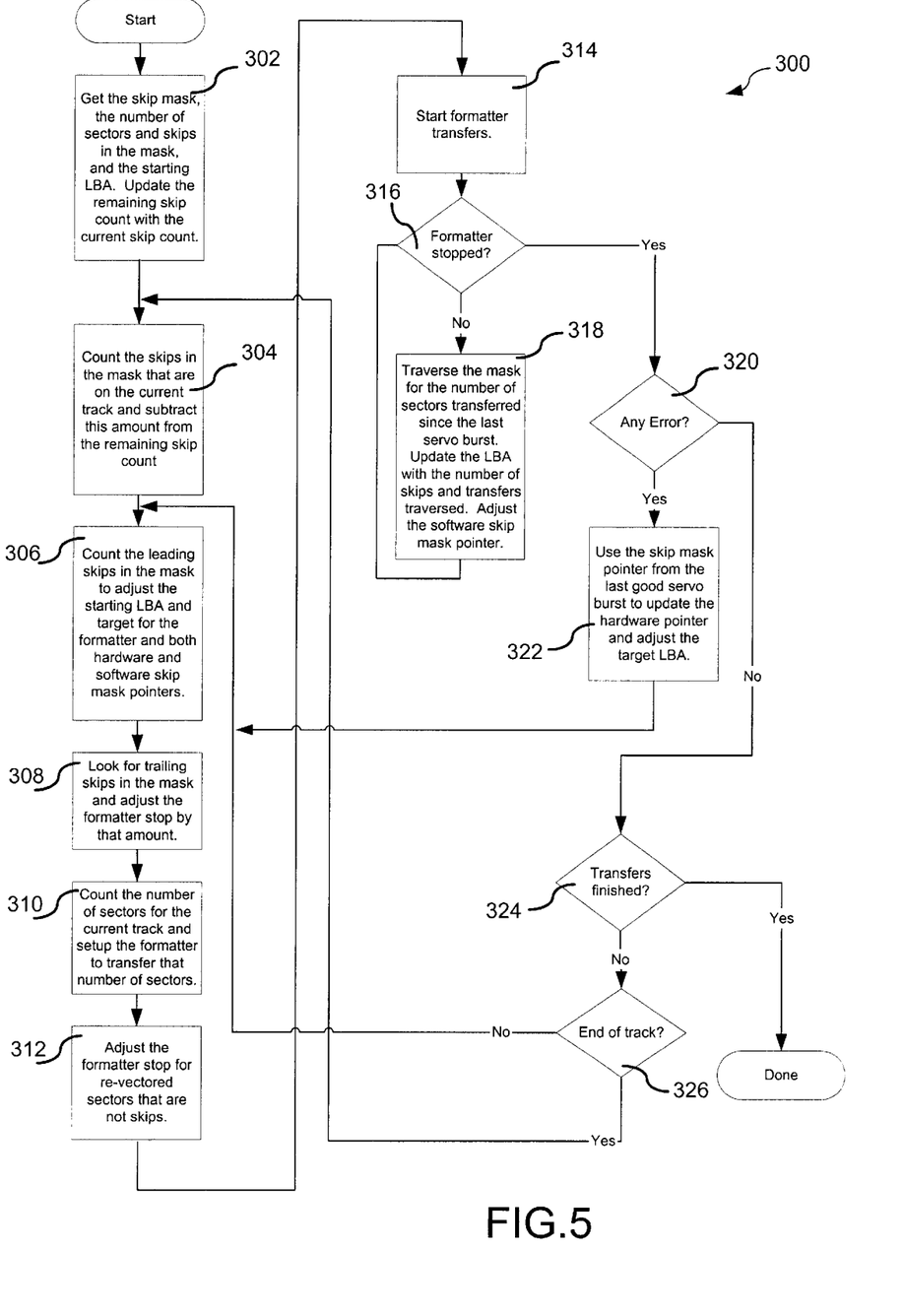
FIG. 5 is a skip mask software flowchart illustrating the skip mask software process in accordance with a preferred embodiment of the present invention.

FIG. 5 is a flow diagram of a preferred embodiment 300 of the skip mask software operation in accordance with the present invention. The process beings in operation 302, where the skip mask 202 and the number of transfers and skips in the mask and the starting LBA that were previously determined by a queue process 250 are read. Control then transfers to operation 304 where the skips in the mask that are on the current track are counted and subtracted from the remaining skip mask count acquired in operation 302. Control then transfers to operation 306 where the leading skips in the mask are counted and used to adjust the starting LBA and target for the formatter 154 and both the hardware 204 and software skip mask pointers. Control then transfers to operation 308, where the mask is searched for trailing skips and the formatter 154 stop is adjusted accordingly. Control then transfers to operation 310, where the number of transfers for the current track are counted and the formatter 154 is set up accordingly. Control then transfers to operation 312, where the formatter stop is adjusted for re-vectored sectors that are not skips in the transfer. Control then transfers to operation 314, where the formatter 154 begins the transfer. Control then transfers to query operation 316 to determine if the formatter 154 has stopped. If the formatter 154 has not stopped, control transfers to operation 318. In operation 318, the mask 202 is traversed equal to the number of sectors transferred since the last servo burst. The LBA is updated with the number of skips and transfers traversed, and the software skip mask pointer is adjusted. Control then transfers back to operation 304. If query operation 316 determines that the formatter 154 has stopped, control transfers to query operation 320. If query operation 320 determines that an error has occurred during the transfer, control transfers to operation 322, and the skip mask pointer from the last good servo burst is used to update the hardware pointer 204 and adjust the target LBA. Control then transfers back to operation 306. If query operation 320 determines no error occurred during the transfer, control transfers to query operation 324. Query operation 324 determines if the transfer has completed. If it has, the subroutine terminates. If query operation 324 determines that the transfer operation has not completed, control transfers to query operation 326. Query operation 326 determines if the end of the track has been reached. If it has, control transfers to operation 304. If the end of track has not been reached, control transfers to operation 306.

Essentially, the hardware and firmware of the present invention interact as follows. As commands are received by the disc drive 100, the firmware calculates which sectors all fall on the current track, and constructs a skip mask 202 accordingly. The skip mask 202 is a large 128-bit register containing transfer/no-transfer bit-wise flags for each sector on a track. A pointer register 204 points to the first mask bit to use in the mask. Once the target sector is reached, the target calculator 160 induces a pulse to the skip mask hardware 162. The bit in the skip mask 202 currently pointed to by the skip mask pointer register 204 is "ANDed" with the pulse generated by the target calculator 160. The skip mask mechanism is therefore transparent to the formatter 154. The mask pointer register 204 is then incremented for the next sector. On each sector pulse thereafter (except sectors that have slipped defect status (defective sectors that have been bypassed, i.e., slipped) or when the stop sector has been reached) the formatter 154 consults the bit in the skip mask 202 currently pointed to, and increments the pointer accordingly. A transfer will only be affected by the skip mask 202 if the sector has good defect status (no defect) or spared status (available as a spare sector). It will not be affected by the mask 202 if the sector has slipped defect status. If the sector has slipped status, the mask pointer register 204 is not incremented and no transfer occurs. The formatter 154 does not stop on spared defective sectors (spare sector that is defective) if the mask 202 entry for that sector is zero. If the mask entry for a spared sector is set, the formatter 154 stops and does not transfer that sector. These requirements are achieved by the firmware setting the sector the formatter 154 is to stop on to the next spared sector that has its mask bit set, or to the end of the transfer, whichever occurs first.

Within the controller ASIC 142 of a disc drive 100, there typically exists a command queuing mechanism. This mechanism allows a disc drive 100 to receive additional commands from the host computer 140 before processing and completing previous commands. To increase performance, the queuing mechanism also typically features a sorting algorithm to ensure that commands are processed as fast as possible by accessing data from storage media such as discs 108 in the most efficient way. For example, suppose a drive receives 3 commands to read sectors 1, 50, and 2. It would typically improve the drive's performance to access sectors 1 and 2 before sector 50.

Figure 6:
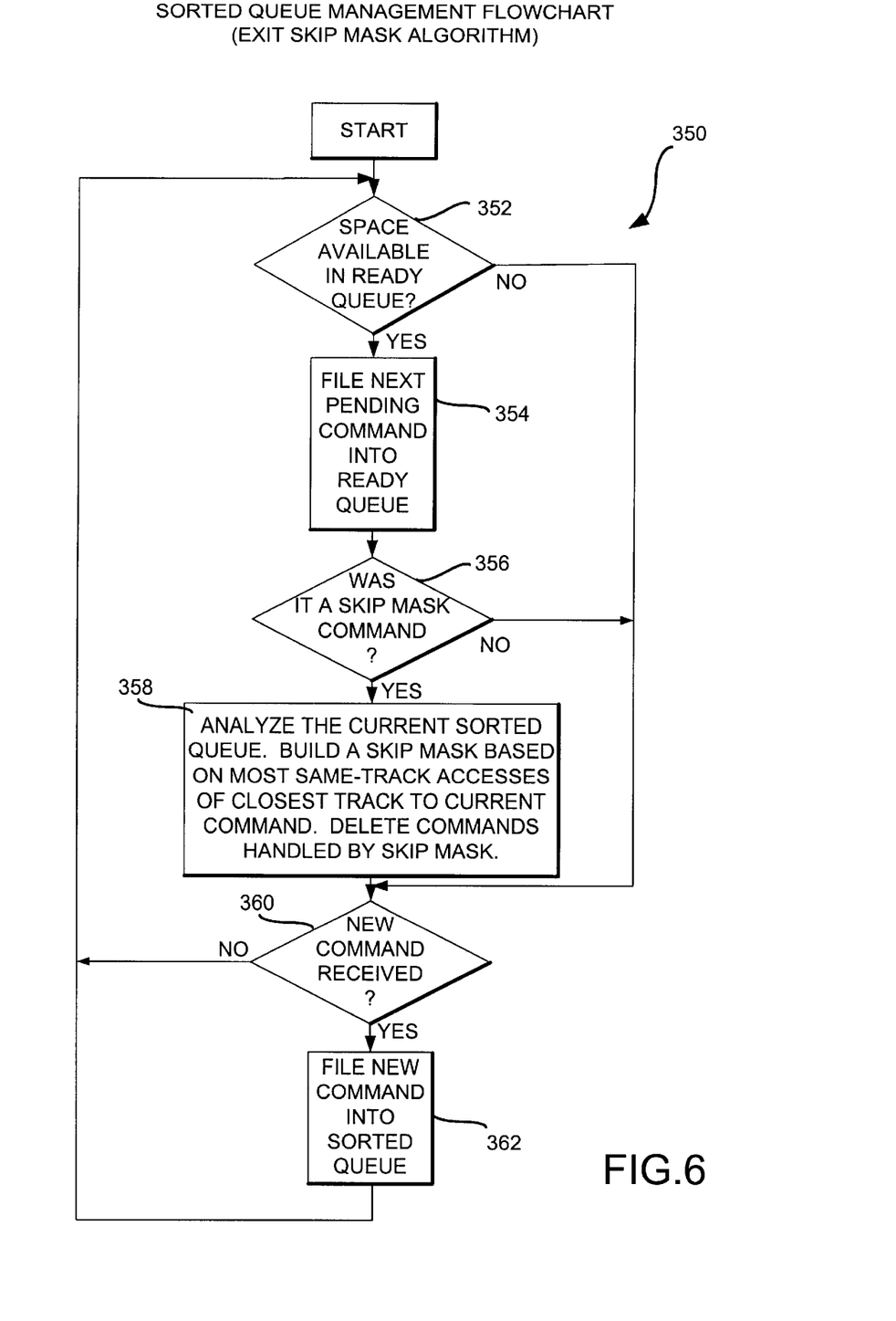
FIG. 6 is a sorted-queue management flowchart detailing an "Exit Skip Mask Algorithm" in accordance with a preferred embodiment of the present invention.
Figure 7:
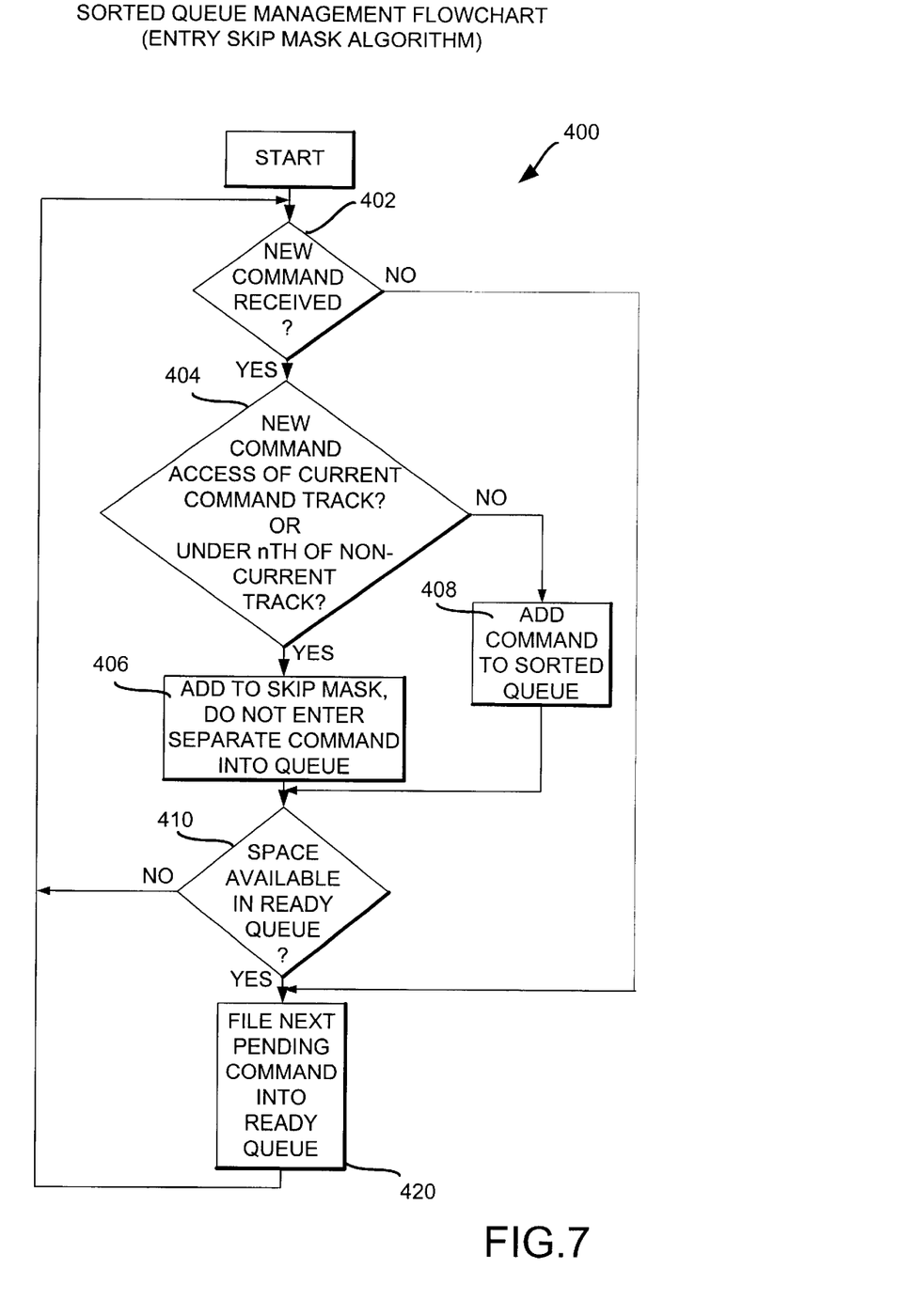
FIG. 7 is a sorted-queue management flowchart detailing an "Entry Skip Mask Algorithm" in accordance with a preferred embodiment of the present invention.
Figure 8:
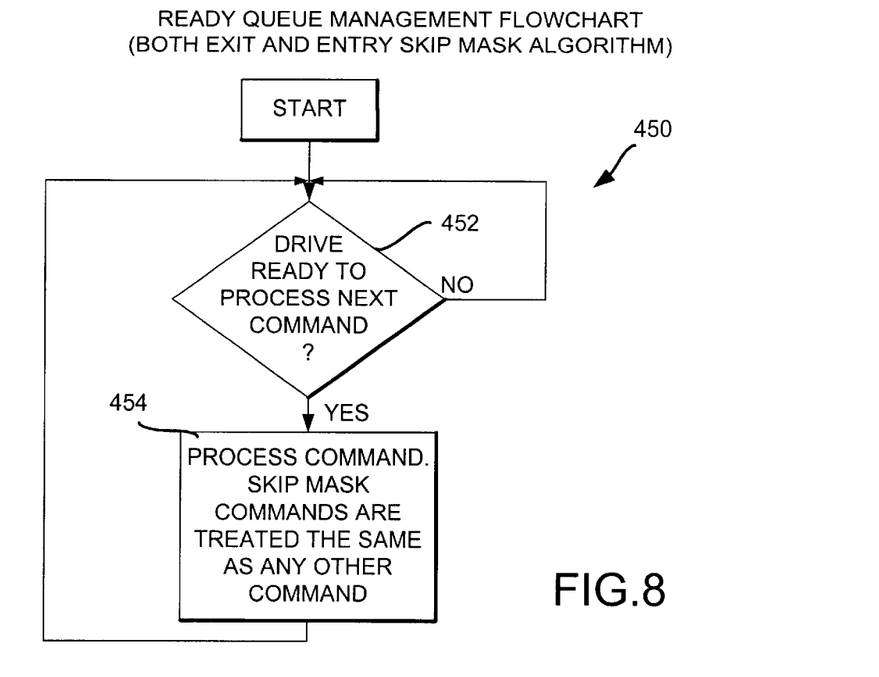
FIG. 8 is a ready-queue management flowchart in accordance with a preferred embodiment of the present invention.

In one embodiment of a disc drive in accordance with the present invention, the command queuing mechanism contains 2 queues—a sorted-queue, and a ready-queue. The sorted-queue contains a list of commands received by the disc drive 100, and is continuously sorted to ensure the disc drive 100 processes the next optimal command. Once the sorting mechanism determines a command is optimal for processing, it is transferred to the ready-queue. The ready-queue is simply a FIFO stack or register of commands to be processed by the disc drive 100. While there are many possible algorithms to implement a skip mask scheme into command queuing, the following discussion will describe two preferred embodiments; additional embodiments will become obvious to one skilled in the art. FIGS. 6–8 illustrate how a skip mask is incorporated into a command queuing mechanism. FIGS. 6 and 7 illustrate two possible embodiments for an overlaid management scheme of the sorted-queue in incorporating the skip mask mechanism of the present invention. FIG. 8 illustrates an overlaid management scheme of the ready-queue in incorporating the skip mask mechanism of the present invention.

FIG. 6 is a flow diagram of a preferred embodiment 350 of a management scheme referred to in this specification as "Exit Skip Mask Algorithm" for the sorted-queue of commands. Control begins at query operation 352. The ready-queue is first checked for an open spot. If no room is available in the ready-queue, control transfers to query operation 360. If there is room for a command in the ready-queue, control transfers to operation 354, where the next pending command is transferred from the sorted-queue into the ready-queue. Control then transfers to query operation 356, which determines if the command was an applicable skip mask command. If the command was an applicable skip mask command, control transfers to operation 358, where the sorted queue is analyzed, and a skip mask 202 is constructed based on the most same-track accesses of the closest track to the command which will be previously processed. Once the skip mask is constructed, any pending commands in the sorted queue which will now be handled by the skip mask command are deleted from the sorted queue. If query operation 356 determines the command that was transferred to the ready-queue in operation 354 was not an applicable skip mask command, the control transfers to query operation 360. In query operation 360, a check is made to determine if any new commands have been received. If a new command has been received, control transfers to operation 362, where it is filed into the sorted-queue, and control subsequently transfers to query operation 352. If no new commands have been received, control transfers to query operation 352.

FIG. 7 is a flow diagram of a preferred embodiment 400 of a management scheme referred to in this specification as "Entry Skip Mask Algorithm" for the sorted-queue of commands. Control begins at query operation 402. Query operation 402 checks to see if a new command has been received. If no new command has been received, control transfer to operation 420. If a new command has been received, control transfers to query operation 404, where the command is checked to determine if it will access the track of the previously executed command, or if it is not the nth (n is a preset parameter) or greater consecutive command which does not access the track of the previously executed command. If the command does not satisfy the requirements of query operation 404, control transfers to operation 408, where it is added to the sorted-queue and control subsequently transfers to operation 410. If the command does satisfy the requirements of query operation 404, control transfers to operation 406, where the command is added to the current skip mask command, but is not filed into the sorted-queue. Control then transfers to query operation 410, and the ready-queue is checked for available space. If the ready-queue can accept another command, control transfers to operation 420, and the next pending command in the sorted-queue is filed into the ready-queue, and control subsequently transfers to operation 402. If query operation 410 determines there is no space available in the ready-queue, control transfers to operation 402.

FIG. 8 is a flow diagram of a preferred embodiment 450 of a management scheme for the ready-queue of commands. The flow illustrated applies to either the "Exit Skip Mask Algorithm", or the "Entry Skip Mask Algorithm" for the sorted-queue of commands. The flow begins at query operation 452. Control simply waits until the drive is ready to begin processing a command. Once ready, control transfers to operation 454, which processes the command (skip mask commands are treated as any other command).

Figure 9:
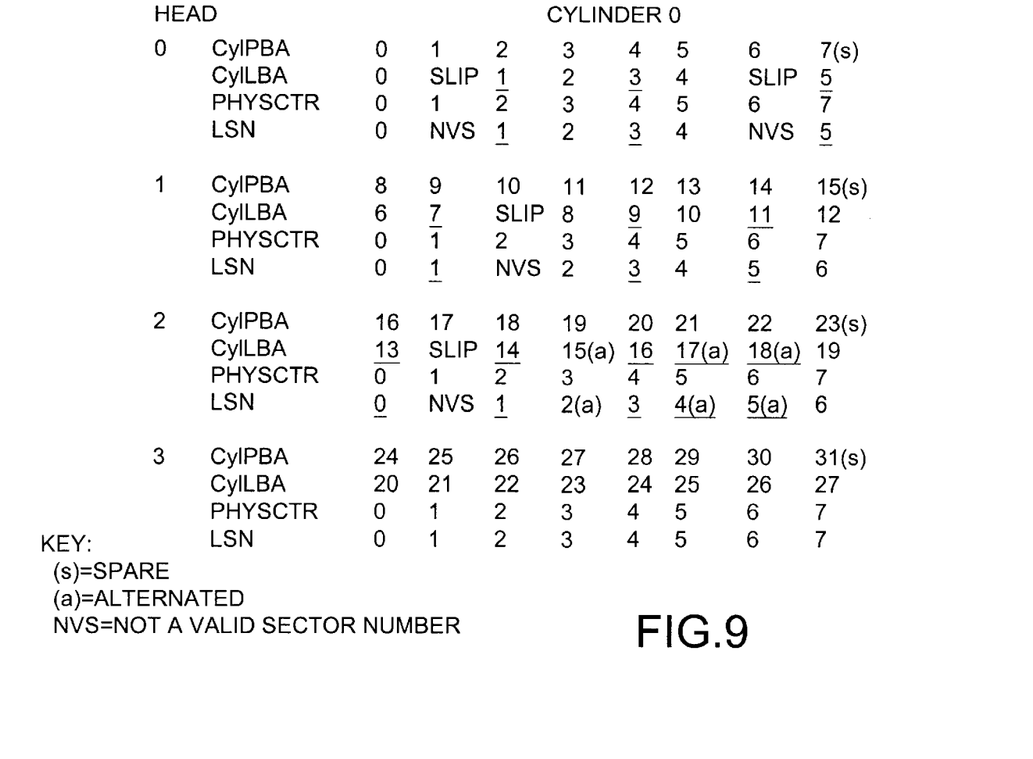
FIG. 9 is a table illustrating a sample LBA to PBA disc mapping in accordance with a preferred embodiment of the present invention.

FIG. 9 is a section of a sample track defect layout including cylinder/head/sector mapping of an embodiment of a disc drive having 4 heads. As illustrated in the figure, the first cylinder has 8 randomly located defects. Four defects are indicated by the word "SLIP" in the CylLBA. The sector that would have logically been placed in the "slip" position has been moved, or "slipped" to the next contiguous non-defective track location. The other four defects are each indicated by the letter (a) in FIG. 9. The data in each of these alternated sectors is moved to a spare sector. The available spare sectors are handled by a different mapping table (not shown). CylPBA is the Physical Block Address from the beginning of the cylinder. CylLBA is the Logical Block Address from the beginning of the cylinder. PHYSCTR is the physical sector from index and LSN is the logical sector from index. The notation (s) indicates a spare sector, (a) indicates an alternated sector (a defective sector whose data has been moved to a spare sector), and NVS indicates a non-valid logical sector. As seen from FIG. 9, CylPBA's 1 and 6 of Head 0 have been slipped, and are therefore non-valid logical sectors. CylPBA 7 is a spare sector, meaning it is available for allocation to map out a defective or slipped defective sector or an alternated defected sector.

Figure 10:
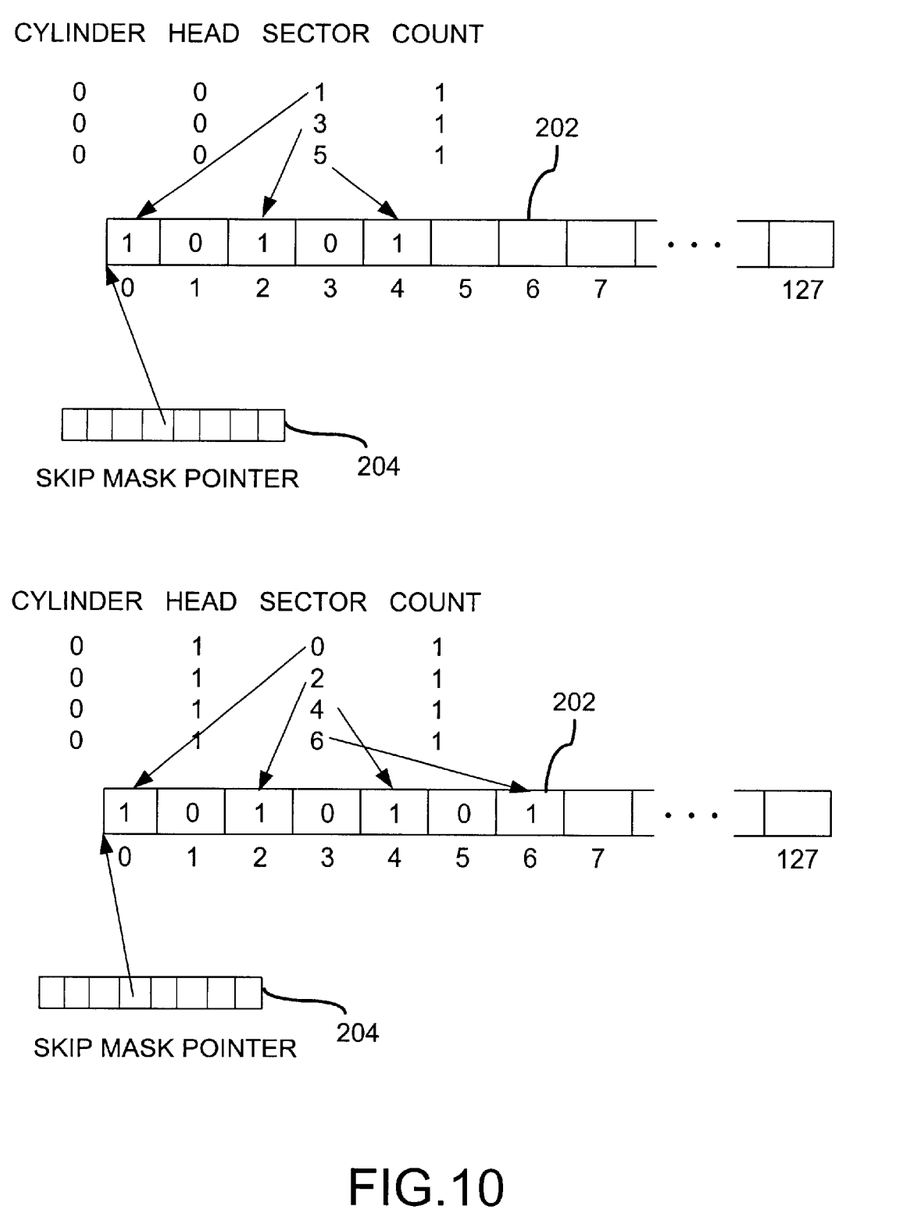
FIG. 10 is a table illustrating a set of incoming access commands from a host computer to a disc drive with the mapping illustrated in FIG. 9, and the resultant skip mask in accordance with a preferred embodiment of the present invention.

FIG. 10 illustrates a sample set of incoming commands and the resultant initial skip mask of a drive with the mapping specified in FIG. 9. The first set of commands access sectors initially physically mapped to cylinder 0, head 0, LSN's 1, 3, and 5 of the disc drive. The firmware constructs the skip mask according to the physical layout of the sector. Therefore the skip mask for this set of transfers is as shown: 1010100xb. Once the drive has seeked to the correct location for the first sector to be transferred, in this case sector 1, the formatter consults the first bit in the mask. In this case, the bit is 1, indicating that the transfer should occur. The second bit correlates to sector 2, and is therefore 0 indicating a transfer should not occur. The bit location of the skip mask does not necessarily correlate with the sector number on the track. This correlation is clearly mapped in FIG. 10.

Figure 11:
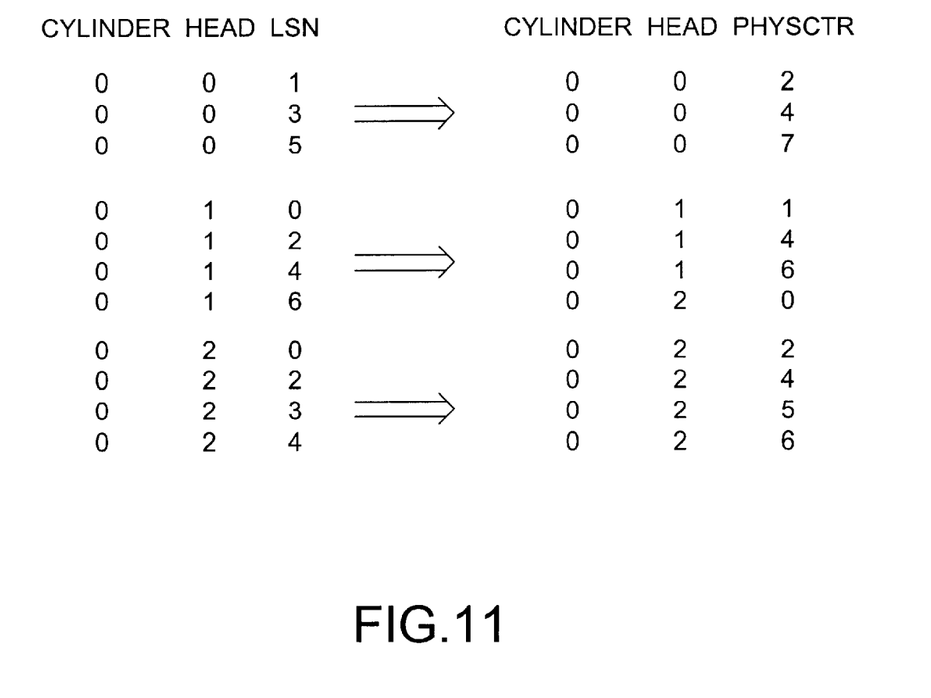
FIG. 11 is a table illustrating a remapped set of received commands from a host computer to a disc drive with the mapping illustrated in FIG. 9, and the resultant skip mask in accordance with a preferred embodiment of the present invention.

FIG. 11 illustrates how the commands are remapped according to the track defect mapping of the drive. The first set of commands access sectors initially physically mapped to cylinder 0, head 0, LSN's 1, 3, and 5 of the disc drive. After the skip mask has been constructed and the drive seeks to the correct track, the track ID information is read to acquire the defect mapping. In the case of the fist set of commands, LSN's 1, 3, and 5 map to PHYSCTR's 2, 4, and 7 respectively. An equivalent correlation exists for the other sets of commands. In the second set for example, LSN's 0, 2, 4, and 6 map to PHYSCTR's 1, 4, 6, and 0 (0 of the next head due to a slipped sector).

In summary, the present invention may be viewed as a method for optimizing access operations to and from the data storage disc (such as 108) in a disc drive (such as 100) that has a data storage disc (such as 108), an actuator assembly (such as 110) for positioning a transducer (such as 118) over the data storage disc (such as 108) and a disc controller (such as including 142, 146, 148, and 150) for communicating with a host computer (such as 140) and controlling positioning of the actuator (such as 110) for accessing data sectors in tracks on the data storage disc (such as 108). The method (such as in operations 250 through 264) includes steps (a) calculating which data sectors to be accessed are on a given track, (b) constructing a skip mask (such as 202) according to the sectors to be accessed on the track, (c) pointing to a first skip mask bit in the skip mask with a skip mask pointer (such as 204), (d) interpreting a current bit pointed to (such as in operations 256 through 266) in the skip mask (such as 202), (e) transferring data in the data sector if the current bit is one (such as in operation 270), and (f) incrementing the skip mask pointer to a next mask bit (such as in operation 268). The method may also include repeating steps (c) through (f) for the next mask bit and these steps may be repeated until a stop sector is reached (such as in operation 260) or an error condition is detected (such as in operation 272).

The method (such as in operation 300) may further include counting skips (such as in operation 304) in the skip mask that are on the current track, subtracting current track skips from a remaining skip count; and counting leading skips in the skip mask (such as in operation 306. The counting step such as in operation 304) may include steps of adjusting a starting Logical Block Address and target for a formatter (such as 154) by the leading skips count such as in operation 306 and adjusting hardware and software skip mask pointers with the leading skip count.

The method (such as in operation 300 may further include steps of determining if an error condition was detected (such as in operation 320) and if so, using the skip mask pointer from a last good servo burst (such as in operation 322) to update the skip mask pointers (such as 204).

Alternatively, the present invention may be viewed as a disc drive (such as 100) having a data storage disc (such as 108), an actuator (such as 110) for positioning a transducer (such as 118) over the data storage disc and a disc controller (such as 142, 143, 146, 148, and 150) for communicating with a host computer (such as 140), controlling position of the actuator (such as 110) and controlling access to data sectors in tracks on the data storage disc (such as 108). In particular, the disc drive includes an interface (such as 144), a read/write channel (such as 146) between the interface (such as 144) and the transducer (such as 118), a formatter (such as 154) between the interface (such as 144) and the read/write channel (such as 146) for timing when data is transferred between the interface (such as 144) and the read/write channel (such as 146), and a skip mask mechanism (such as 162) between a target calculator (such as 160) and the formatter (such as 154). The skip mask mechanism (such as 162) provides a masked input to the formatter (such as 154) for controlling passage of data between the interface (such as 144) and the read/write channel (such as 146). The skip mask mechanism (such as 162) is operable to optimize sequencing of access to and from data sectors on a track on the disc (such as 108).

The skip mask mechanism (such as 162) includes a skip mask register (such as 202) that defines a set of data sector transfer/no-transfer bits for a track. It also has a skip mask pointer register (such as 204) that defines a logical memory address in the range of an interpreted bit of the skip mask register (such as 202). A skip mask hardware control routine defining sequential states of the skip mask register (such as 202) and skip mask pointer register (such as 204). A skip mask software control routine (such as in operation sequences 250 and 300) reads and writes the skip mask register (such as 202) and skip mask pointer register (such as 204).

The disc drive (such as 100) may also include a sorted-queue (such as 350 and 400) that defines a temporary memory storage location for a list of commands received from the host computer (such as 140) that are to be analyzed by the disc drive (such as 100) and sorted according to which command is optimal to be next executed and a ready-queue defining a temporary memory storage location for a list of commands received from the sorted-queue that are ready to be executed by the disc drive in a specific order. The disc drive (such as 100) may include an exit skip mask routine (such as 400) wherein the exit skip mask routine (such as in operations 402 through 420) only analyzes the current sorted-queue and builds a new skip mask every time the existing skip mask command is transferred into the ready-queue. The disc drive (such as 100) may include an entry skip mask routine (such as 350) wherein the entry skip mask routine only modifies the skip mask on each new command filed into the sorted-queue (such as in operations 352 through 362).

The disc drive (such as 100) skip mask mechanism (such as 162) may include a skip mask register (such as 202) and a skip mask pointer register (such as 204) and hardware and firmware to calculate which data sectors to be accessed are on a given track. The registers (such as 202 and 204) store skip mask bits. The current bit in the skip mask register (such as 202) is pointed to by the skip mask pointer (such as in 204). The routine (such as in operations 266 through 270) transfers data in the data sector if the current bit is set to one.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A disc drive having a data storage disc, an actuator for positioning a transducer over the data storage disc and a disc controller for communicating with a host computer, controlling position of the actuator and controlling access to data sectors in tracks on the data storage disc, the disc drive comprising:

an interface;

a read/write channel between the interface and the transducer;

a formatter between the interface and the read/write channel for timing when data is transferred between the interface and the read/write channel;

a skip mask mechanism between a target calculator and the formatter providing a masked input to the formatter for controlling passage of data between the interface and the read/write channel;

a sorted-queue defining a temporary memory storage location for a list of commands received from the host computer that are to be analyzed by the disc drive and sorted according to which command is optimal to be next executed; and a ready-queue defining a temporary memory storage location for a list of commands received from the sorted-queue that are ready to be executed by the disc drive in a specific order.

2. The disc drive according to claim 1 wherein the skip mask mechanism is operable to optimize sequencing of access to and from data sectors on a track on the disc.

3. The disc drive according to claim 2 wherein the skip mask mechanism comprises:

a skip mask register defining a set of data sector transfer/no-transfer bits for a track;

a skip mask pointer register defining a logical memory address in the range of an interpreted bit of the skip mask register;

a skip mask hardware control routine defining sequential states of the skip mask register and skip mask pointer register; and a skip mask software control routine that reads and writes the skip mask register and skip mask pointer register.

4. The disc drive according to claim 3 further comprising:

a sorted-queue defining a temporary memory storage location for a list of commands received from the host computer that are to be analyzed by the disc drive and sorted according to which command is optimal to be next executed;

a ready-queue defining a temporary memory storage location for a list of commands received from the sorted-queue that are ready to be executed by the disc drive in a specific order.

5. The disc drive according to claim 4 further comprising an exit skip mask routine wherein the exit skip mask routine only analyzes the current sorted-queue and builds a new skip mask every time the existing skip mask command is transferred into the ready-queue.

6. The disc drive according to claim 4 further comprising an entry skip mask routine wherein the entry skip mask routine only modifies the skip mask on each new command filed into the sorted-queue.

7. The disc drive according to claim 1 wherein the skip mask mechanism comprises a skip mask register and a skip mask pointer register and hardware and firmware to calculate which data sectors to be accessed are on a given track and stores skip mask bits in the skip mask register.

8. The disc drive according to claim 7 wherein a current bit in the skip mask register is pointed to by the skip mask pointer and transfers data in the data sector if the current bit is one.

* * * * *